United States Patent
Huang et al.

(10) Patent No.: US 6,702,971 B2
(45) Date of Patent: Mar. 9, 2004

(54) PRODUCTION METHOD OF A POLYTETRAFLUOROETHYLENE SHEET OR FILM

(75) Inventors: James Huang, Taichung (TW); William Chou, Taichung (TW); David Chou, Taichung (TW); Shia-Chung Chen, Taipei (TW); Woh-Jer Lee, Taichung (TW); Lei-Ti Huang, Taichung (TW); Ching-Yao Huang, Taichung (TW)

(73) Assignee: Yeu Ming Tai Chemical Industrial Co., Ltd., Taichung (TW)

( * ) Notice: Subject to any disclaimer, the term of this patent is extended or adjusted under 35 U.S.C. 154(b) by 129 days.

(21) Appl. No.: 09/985,385

(22) Filed: Nov. 2, 2001

(65) Prior Publication Data

US 2003/0015821 A1 Jan. 23, 2003

(30) Foreign Application Priority Data

Jun. 22, 2001 (JP) ........................................ 2001-189470

(51) Int. Cl.[7] ............................................. B29C 47/12
(52) U.S. Cl. .............................. 264/177.17; 264/177.1; 264/167; 425/467
(58) Field of Search .................. 264/177.17, 177.1, 264/167; 425/465, 66, 380, 324.1, 467; 277/627, 945, 946

(56) References Cited

U.S. PATENT DOCUMENTS

| | | | |
|---|---|---|---|
| 3,887,741 A | * | 6/1975 | Dwyer ........................ 428/188 |
| 3,953,566 A | | 4/1976 | Gore |
| 3,983,283 A | * | 9/1976 | Bagley ........................ 428/116 |
| 4,096,227 A | | 6/1978 | Gore |
| 4,385,093 A | | 5/1983 | Hubis |
| 4,767,309 A | * | 8/1988 | Mizuno et al. ............... 425/461 |
| 4,898,638 A | | 2/1990 | Lugez |
| 5,098,625 A | | 3/1992 | Huang et al. |
| 5,286,568 A | | 2/1994 | Bacino et al. |
| 5,418,054 A | | 5/1995 | Sun |
| 5,486,010 A | | 1/1996 | Hamilton et al. |
| 5,560,986 A | | 10/1996 | Mortimer, Jr. |
| 5,830,516 A | * | 11/1998 | McAlpine et al. .......... 425/380 |
| 5,855,781 A | * | 1/1999 | Yorita et al. ........... 210/321.82 |
| 5,964,465 A | * | 10/1999 | Mills et al. .................. 277/316 |
| 5,993,711 A | * | 11/1999 | Grunstra ..................... 264/103 |
| 6,080,472 A | | 6/2000 | Huang et al. |
| 6,621,034 B2 | * | 9/2003 | Shibagaki et al. ....... 219/69.17 |

* cited by examiner

Primary Examiner—Michael Colaianni
Assistant Examiner—Monica A Fontaine
(74) Attorney, Agent, or Firm—Sughrue Mion, PLLC

(57) ABSTRACT

To provide a method of producing a uniaxially stretched polytetrafluoroethylene gasket tape, which comprises: (1) a step for preparing a paste comprising a mixture of a polytetrafluoroethylene powder obtained by emulsion polymerization and an extrusion aid, (2) a step for extruding the paste by means of an extruder equipped with a die which has plural separators inside an orifice thereof having a rectangular cross section, (3) a step for rolling, in the extruding direction, an extrudate having slit lines to give a rolled polytetrafluoroethylene sheet, (4) a step for uniaxially stretching the rolled sheet in the rolling direction after removing the extrusion aid from the rolled sheet, and (5) a step for heat-treating the obtained uniaxially stretched polytetrafluoroethylene sheet. The die of the extruder has plural sheet-like separators in the orifice thereof having a rectangular cross section. The separators are mounted so that free ends thereof are located at a point exceeding a center point of a long side of the orifice, and function to provide slit lines inside the extrudate in parallel with the long side of the orifice. The high performance inexpensive PTFE gasket tape is produced by the uniaxially stretching method and has properties equal to those of biaxially stretched PTFE gasket tape.

11 Claims, 1 Drawing Sheet

PRODUCTION METHOD OF A POLYTETRAFLUOROETHYLENE SHEET OR FILM

FIELD OF THE INVENTION

The present invention relates to a gasket tape produced from a uniaxially stretched tape mainly comprising polytetrafluoroethylene (PTFE) and a production method thereof.

BACKGROUND OF THE INVENTION

A PTFE gasket tape is used for various seals, particularly for sealing of chemical equipment and plant in which chemical solutions are handled.

It is known that there are PTFE gasket tapes produced by using a uniaxially stretched tape (U.S. Pat. No. 3,953,566 and U.S. Pat. No. 5,098,625) and a biaxially stretched tape (U.S. Pat. No. 5,964,465 and U.S. Pat. No. 6,080,472).

In case of the uniaxially stretched gasket tape, a high strength is exhibited in the stretching direction but a strength in the direction crossing at right angles to the stretching direction is not sufficient and creep resistance is low. Thus the uniaxially stretched gasket tape is inferior in performance as a sealing material and its use is limited.

On the other hand the biaxially stretched gasket tape is excellent in sealing properties such as a strength and creep resistance in the longitudinal direction and transverse direction (biaxially stretching directions) of the tape. However in order to obtain an article uniformly stretched in the two directions, a high grade quality control is required and as a result, production cost is increased which results in an expensive product.

Also the above-mentioned U.S. Pat. No. 5,964,465 further describes a technique for producing a tape by producing a biaxially stretched film having a thickness as thin as 25 to 510 μm, overlapping a plurality of those thin films (tens of films) to make a sheet and then slitting the sheet. However in order to produce such a thin biaxially stretched film, intensive management is required for production steps, and it is difficult to increase a yield.

An object of the present invention is to provide a method of producing, by a uniaxially stretching method which is easy in production management, a gasket tape which is equal to a gasket tape produced by a biaxially stretching method, and to provide a gasket tape which is produced by the uniaxially stretching method and is excellent in sealing property.

SUMMARY OF THE INVENTION

The present invention relates to a method of producing a polytetrafluoroethylene (PTFE) sheet or film, wherein the following steps (1) to (5) are carried out in that order:

(1) a step for preparing a paste comprising a mixture of a polytetrafluoroethylene powder obtained by emulsion polymerization and an extrusion aid, (2) a step for extruding the paste by means of an extruder equipped with a die having an orifice which has a rectangular cross section and is provided with plural separators inside thereof, (3) a step for rolling, in the extruding direction, an extrudate having slit lines to give a rolled PTFE sheet, (4) a step for uniaxially stretching the rolled sheet in the rolling direction after removing the extrusion aid from the rolled sheet, and (5) a step for heat-treating the uniaxially stretched PTFE sheet at a temperature within a range of 340° to 380° C.

The above-mentioned die of the extruder is provided with a plurality of sheet-like separators, preferably 2 to 8 separators in parallel with a long side of the orifice having a rectangular cross section. The plural separators are mounted so that any of free ends of the separators is located at a point exceeding a center point of the long side of the orifice. The separators function to slit the inside of the extrudate in parallel with the long side of the orifice.

The gasket tape of the present invention may be produced by immediately subjecting the uniaxially stretched PTFE sheet obtained in the step (4) to heat-treating of the step (5). However a strength of the gasket tape can be increased more by overlapping a plurality of the uniaxially stretched PTFE films obtained in the step (4) and then carrying out the heat-treating of the step (5) or by overlapping a plurality of the uniaxially stretched PTFE films obtained in the step (4) and a plurality of biaxially stretched PTFE films each other preferably alternately and then carrying out the heat-treating of the step (5).

It is preferable that the heat-treating step (5) is carried out at 340° to 380° C. for 30 minutes or more.

In case of producing products having a given width such as a gasket tape, slitting into a given width may be carried out after the heat-treating step (5) or the heat-treating step (5) may be carried out after the slitting into a given width is carried out subsequently to the uniaxially stretching step (4).

Also a gasket tape having an adhesive layer may be produced by carrying out a step (6) for providing an adhesive layer on at least one surface of the tape after the heat-treating step (5).

The present invention also relates to a PTFE gasket tape which is obtained by heat-treating the uniaxially stretched PTFE sheet and has a matrix tensile strength (MTS) of 2,300 to 5,700 psi in the longitudinal direction ($MTS_L$) and 130 to 660 psi in the transverse direction ($MTS_T$) and $MTS_L/MTS_T$ of about 8 to about 18, or a PTFE gasket tape which is obtained by heat-treating a plurality of uniaxially stretched PTFE films overlapped each other or heat-treating uniaxially stretched PTFE films and biaxially stretched PTFE films overlapped each other preferably alternately and has a matrix tensile strength (MTS) of 2,500 to 8,000 psi in the longitudinal direction ($MTS_L$) and 200 to 700 psi in the transverse direction ($MTS_T$) and $MTS_L/MTS_T$ of about 8 to about 11.

DETAILED DESCRIPTION OF THE INVENTION

The method of producing a uniaxially stretched PTFE sheet or film (hereinafter represented by a sheet unless otherwise noted) of the present invention comprises (1) the step for preparing a paste of a mixture comprising a PTFE powder, (2) the step for extruding the paste, (3) the step for rolling the extrudate, (4) the step for uniaxially stretching the rolled sheet and (5) the step for heat-treating the uniaxially stretched sheet.

The PTFE powder to be used is so-called a fine powder obtained by coagulating a dispersion of PTFE particles having an average primary particle size of 0.18 to 0.25 μm and prepared by emulsion polymerization. PTFE to be used may be a tetrafluoroethylene (TFE) homopolymer, a modified PTFE obtained by modifying with a perfluoroolefin such as hexafluoropropylene (HFP) or perfluoro(alkyl vinyl ether) (PAVE) in an amount not lowering properties of PTFE (about 1% by weight or less), and a mixture of PTFE and modified PTFE.

The paste of the mixture basically comprises the PTFE powder and an extrusion aid, and known extrusion aids can be used. For example, mineral oils such as naphtha are suitable. An amount of the extrusion aid is from about 17 parts by weight to about 25 parts by weight based on 100 parts by weight of the PTFE powder.

Further in order to impart creep resistance to the sheet and gasket tape, a filler may be added to the paste. The preferable filler is at least one selected from the group consisting of titanium oxide, silicon oxide, ceramic powder, graphite and D-glucosamine. When D-glucosamine is used, an action as a deodorant can be expected. It is preferable that an amount of the filler is from 0.5 to 25 parts by weight based on 100 parts by weight of the PTFE powder.

The so-obtained paste is extruded in the following extrusion step (2) through the die with separators, which is one of the features of the present invention. For the extrusion, a paste extrusion machine with a ram cylinder which has been used for extrusion of PTFE paste, or the like can be used. A reduction ratio at extruding the paste is 1:120 or less, preferably 1:100 or less, more preferably 1:50 or less.

The die with separators of the extruder to be used in the present invention is explained below according to the drawings.

Figure 1:
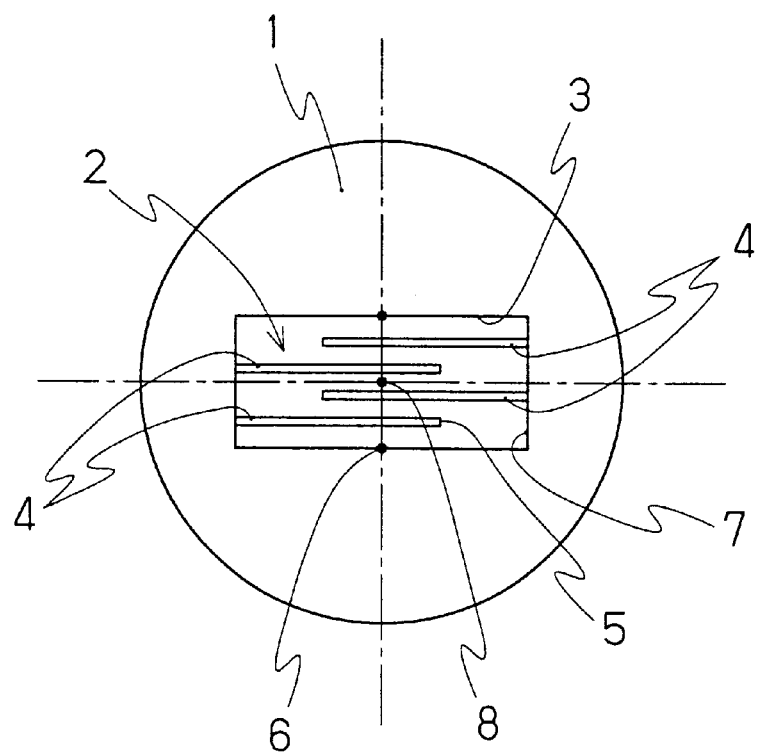
FIG. 1 is a diagrammatic front view of the die of the extruder to be used in the present invention.

FIG. 1 is a diagrammatic front view of the die of the extruder. The die 1 has an orifice 2 having a rectangular cross section, and inside of the orifice 2 are provided plural sheet-like separators 4 in parallel with a long side 3 of the orifice.

A method of fixing the separators 4 is not limited particularly. The separators may be fixed by casting or welding or may be removable to enable a length thereof to be adjusted, or the number of separators may be changeable. The separators are preferably in the form of single-edged plate.

It is important that any of the separators 4 is mounted so that free ends 5 thereof are located at a point exceeding a center point 6 of the long side 3 of the orifice 2. It is desirable that the even number of separators, preferably 2, 4 or 6 separators are mounted so that the same number of separators are protruded alternately on both short sides 7. The free ends 5 of the separator and the counterpart separator are point-symmetrical with respect to an intersection 8 of center lines of the long side 3 and short side 7.

The location of the free end 5 of the separator 4 is a point exceeding the center point 6 of the long side 3, i.e. a point exceeding 50% of a length of the long side, preferably 50 to 85%, particularly preferably 60 to 75% of the length of the long side. A thickness of the separator is from 0.5 to 2 mm, preferably about 1 mm.

Figure 2:
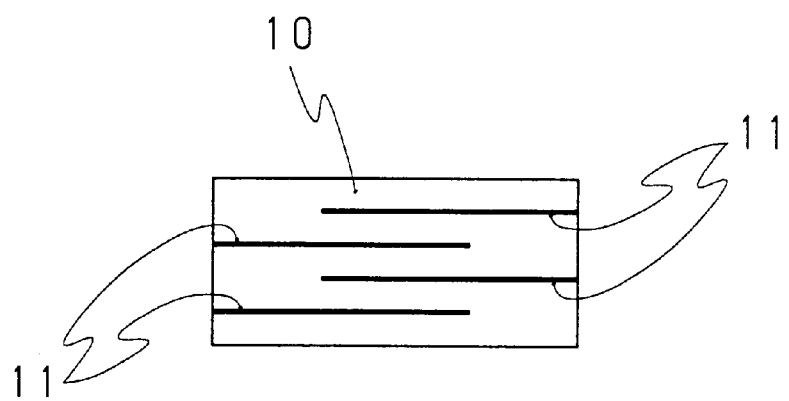
FIG. 2 is a diagrammatic cross-sectional view of the extrudate produced by using the die of FIG. 1.

As shown in FIG. 2, the separators function to provide slit lines 11 deep inside the extrudate 10 in parallel with the long side of the extrudate 10.

The so-obtained extrudate slit deep with the separators is rolled in the extruding direction in the rolling step (3) to be formed into a sheet or film. In the rolling step the extrudate is rolled while slipping along the slit lines in the direction crossing at right angles to the rolling direction. It is presumed that as a result, a strength can be obtained even in the direction crossing at right angles to the rolling direction (the same direction as a stretching direction mentioned hereinafter). For the rolling, conventional rolling equipment and rolling conditions which have been used for rolling of PTFE can be used. The rolling is carried out preferably with two calender rolls.

A thickness of the rolled sheet is from about 0.5 mm to about 4 mm, and a thickness of the rolled film is from about 100 μm to about 300 μm.

After removing the extrusion aid from the obtained rolled sheet (or film) by usual method, the rolled sheet is uniaxially stretched in the rolling direction (extruding direction) (stretching step (4)). The method of removing the extrusion aid is not limited particularly, and a heating method, an extraction method with a solvent, or the like can be used preferably.

The sheet is uniaxially stretched at a stretching ratio of 2 to 10 times, preferably 2 to 5 times by using a stretching machine. When the stretching ratio is low, a strength in the longitudinal direction is lowered, and when too high, a strength in the transverse direction is lowered extremely. A thickness of the stretched sheet is from 0.3 to 3 mm, and a thickness of the stretched film is from 20 to 60 μm.

In order to increase a strength and enhance handling property and dimensional stability of the gasket tape, heat-treating is carried out (heat-treating step (5)). The heat-treating is usually carried out at a temperature of 340° to 380° C. for 30 minutes to 2 hours.

In case of the uniaxially stretched film, a plurality of films are overlapped each other into a given thickness. In that case, the following overlapping method is preferable.

(A) The heat-treating step (5) is carried out after a plurality of the uniaxially stretched PTFE films obtained by the step (4) are overlapped each other.

(B) The heat-treating step (5) is carried out after the uniaxially stretched PTFE films obtained by the step (4) and biaxially stretched PTFE films (for example, those described in U.S. Pat. No. 6,080,472) are overlapped each other preferably alternately.

In case of the method (B), a ratio of the number of uniaxially stretched films to the number of biaxially stretched films is 70/30 to 30/70, particularly 55/45 to 45/55.

When the films are overlapped each other, the step for slitting into a width of the tape after the lamination thereof may be carried out either before or after the heat treatment.

The heat-treated PTFE gasket tape of the present invention which is obtained from the PTFE sheet has a matrix tensile strength (MTS) of 2,300 to 5,700 psi in the longitudinal direction ($MTS_L$) and 130 to 660 psi in the transverse direction ($MTS_T$) and $MTS_L/MTS_T$ of about 8 to about 18.

The heat-treated PTFE gasket tape which is prepared by overlapping the uniaxially stretched PTFE films each other has a matrix tensile strength (MTS) of 2,500 to 8,000 psi in the longitudinal direction ($MTS_L$) and 200 to 700 psi in the transverse direction ($MTS_T$) and $MTS_L/MTS_T$ of about 8 to about 11.

Though excellent properties which the gasket tape of the present invention has as a sealing material cannot be deduced directly from such a strength, as it is clear from the results of examples and comparative examples mentioned hereinafter, it can be said that only by uniaxial stretching, the gasket tape of the present invention has a sealing performance equal to that of the biaxially stretched tape.

The gasket tape of the present invention may be provided with an adhesive layer for temporary adhesion by coating an adhesive or a pressure sensitive adhesive on at least one surface thereof. In that case, known adhesives or pressure sensitive adhesives may be used.

The gasket tape of the present invention can be used for known applications, and is useful as a sealing material for, for example, pipes, flanges and in addition, various tanks and distillers for chemical equipment, chemicals and foods production plant, semiconductor production equipment, etc.

Then the present invention is explained by means of examples, but is not limited to them.

EXAMPLE 1

A PTFE fine powder and extrusion aid (naphtha) were mixed in a ratio of 80/20 (weight ratio) to give a paste to be extruded. Then the paste was extruded at a reduction ratio of 1/33 by using an extruder provided with four 1 mm thick separators nearly at regular intervals so that free ends of the separators are located at a point of about 60% (about 29 mm) of a length of long side of an orifice (16 mm×48 mm rectangular cross section) of a die as shown in FIG. 1. Thus an extrudate having four slit lines was obtained.

The extrudate was passed between two 500 mm diameter rolls in the extruding direction and thus rolled. As a result, a rolled sheet of 180 mm wide×1 mm thick was produced.

The rolled sheet was heated to 280° C. to remove the extrusion aid, and then uniaxially stretched at a stretching ratio of 3.5 times to give a 0.28 mm thick uniaxially stretched film.

Then ten of the obtained uniaxially stretched films were overlapped each other and passed between two rolls for adhering by compression. After that, the adhered films were heated at 350° C. for one hour and then slit into 15 mm width to give a 3 mm thick gasket tape.

With respect to the obtained gasket tape, the following properties were evaluated. The results are shown in Table 1.
(Compressibility)

Measurement is made according to ASTM F 36. It can be evaluated that the larger the obtained value is, the more excellent the sealing property is.
(Recoverability)

Measurement is made according to ASTM F 36. It can be evaluated that the larger the obtained value is, the more excellent the sealing property is.
(Sealing Property)

Measurement is made according to ASTM F 37-B. It can be evaluated that the smaller the obtained value is, the more excellent the sealing property is.
(Creep Relaxation)

Measurement is made according to ASTM F 38-B. It can be evaluated that the smaller the obtained value is, the more excellent the sealing property is.
(MTS)

$MTS_L$ in the longitudinal direction of the tape and $MTS_T$ in the transverse direction of the tape are calculated from a tensile strength (TS) by using the following equation.

$$MTS=TS\times(dPTFE/dPTFE \text{ of tape})$$

TS: Tensile strength of tape. A tensile strength in the longitudinal direction of the tape ($TS_L$) and a tensile strength in the transverse direction of the tape ($TS_T$) are measured (A measuring method is mentioned below).
dPTFE of tape: Specific gravity of tape (A measuring method is mentioned below).
dPTFE: Specific gravity of starting PTFE (assumed to be 2.20 g/cc)

The tensile strength (TS) is measured by the following method.

A heat-treated PTFE tape is cut to give a test piece of ½ inch (12.5 mm) wide×7 inch (175 mm) long. The width and thickness are measured precisely by using calipers and dial gauge, respectively. The test piece is mounted on a tensile tester so that a grip distance becomes 5 inches (125 mm), and then pulled at a crosshead speed of 10 inches (250 mm)/min to measure a maximum load at break of the test piece. The tensile strength (TS) is obtained by the following equation.

$$TS=F/(b\times t)$$

F: Maximum load at break (pound)
b: Width of test piece (inch)
t: Thickness of test piece (inch)

The specific gravity is obtained by the following method.

A heat-treated PTFE tape is cut to give a test piece of about 15 mm wide×about 250 mm long. The length, width and thickness are measured precisely by using a metallic linear scale, calipers and dial gauge, respectively. The test piece is folded and a weight is measured precisely with a chemical balance (reciprocal sensibility: 0.1 mg). The specific gravity is obtained by the following equation.

$$dPTFE \text{ of tape}=W/(l\times b\times t)$$

W: Weight of tape (gram)
l: Length of test piece (cm)
b: Width of test piece (cm)
t: Thickness of test piece (cm)

Comparative Example 1

A conventional uniaxially stretched tape was produced by rolling, in the same manner as in Example 1, a tape extruded by using a die having no separators, removing an extrusion aid, uniaxially stretching, heat-treating and then slitting. Each property of the tape was measured in the same manner as in Example 1. The results are shown in Table 1.

Comparative Example 2

A PTFE tape was produced in the same manner as in Example 1 except that the heat-treating was carried out at a temperature of 300° C. Each property of the tape was measured in the same manner as in Example 1. The results are shown in Table 1.

Comparative Example 3

An extrusion aid was removed from a rolled sheet (180 mm wide×1 mm thick) produced in the same manner as in Example 1 except that the extruding was carried out by using a die having no separators. Then the sheet was biaxially stretched in the same direction as the extruding and rolling direction and a direction crossing at right angles thereto at a stretching ratio of four times, respectively to give a 0.07 mm thick biaxially stretched film. Then forty-five biaxially stretched films were overlapped each other, adhered by compression and heat-treated at 350° C. for one hour, followed by slitting into 15 mm width to give a 3.05 mm thick biaxially stretched tape. With respect to the obtained biaxially stretched tape, each property of the tape was measured in the same manner as in Example 1. The results are shown in Table 1.

EXAMPLE 2

Paste extrusion was carried out in the same manner as in Example 1 except that a location of a free end of the separator was set at a point of about 70% (about 33.6 mm) of a length of a long side of an orifice. The obtained extrudate was rolled in the same manner as in Example 1 and an extrusion aid was removed, followed by uniaxially stretching at a stretching ratio of five times in the same direction as the rolling direction to give a 0.21 mm thick uniaxially stretched film. Ten of the uniaxially stretched films were overlapped each other, adhered by compression and heat-treated at 360° C. for forty minutes, followed by slitting into 15 mm width to give a 2.00 mm thick uniaxially stretched tape. With respect to the obtained uniaxially The rolled sheet was heated to 280° C. to remove the extrusion aid, and was uniaxially stretched at a stretching ratio of 3 times to give a uniaxially stretched sheet. The obtained uniaxially stretched sheet was slit into 15 mm width, followed by heating at 360° C. for 30 minutes to give a 15 mm wide×0.8 mm thick gasket tape.

Each property of the tape was measured in the same manner as in Example 1. The results are shown in Table 1.

TABLE 1

|  | Ex.1 | Com. Ex.1 | Com. Ex.2 | Com. Ex.3 | Ex.2 | Com. Ex.4 | Ex.3 | Ex.4 |
| --- | --- | --- | --- | --- | --- | --- | --- | --- |
| Compressibility (%) | 63 | 68 | 64 | 66 | 68 | 60 | 66 | 65 |
| Recoverability (%) | 25 | 3 | 6 | 26 | 27 | 18 | 26 | 25 |
| Sealing property (Leakage: ml/hr) | 0.03 | 0.06 | 0.05 | 0.03 | 0.03 | 0.05 | 0.03 | 0.04 |
| Creep relaxation (%) | 25 | 55 | 60 | 24 | 24 | 45 | 25 | 25 |
| MTS (psi) |  |  |  |  |  |  |  |  |
| Longitudinal direction ($MTS_L$) | 6050 | 5900 | 6100 | 6200 | 4800 | 4750 | 7500 | 3300 |
| Transverse direction ($MTS_T$) | 210 | 195 | 120 | 6700 | 375 | 163 | 590 | 220 | stretched tape, each property of the tape was measured in the same manner as in Example 1. The results are shown in Table 1.

Comparative Example 4

Paste extrusion was carried out in the same manner as in Example 2 except that a location of a free end of the separator was set at a point of about 30% (about 14.5 mm) of a length of a long side of an orifice. The obtained extrudate was rolled in the same manner as in Example 2 and an extrusion aid was removed, followed by uniaxial stretching at a stretching ratio of five times. The obtained ten uniaxially stretched films were overlapped each other, adhered by compression and heat-treated at 360° C. for forty minutes, followed by slitting into 15 mm width to give a 2.00 mm thick uniaxially stretched tape for comparison. With respect to the obtained uniaxially stretched tape, each property of the tape was measured in the same manner as in Example 1. The results are shown in Table 1.

EXAMPLE 3

A 0.12 mm thick uniaxially stretched film was produced in the same manner as in Example 1 except that a uniaxial stretching ratio was changed to 10 times.

The obtained twenty uniaxially stretched films and nineteen biaxially stretched films produced in Comparative Example 3 were alternately overlapped each other so that the top and bottom thereof were the uniaxially stretched films, followed by adhering by compression, heat-treating at 350° C. for one hour and slitting into 15 mm width to give a 3.00 mm thick gasket tape. Each property of the tape was measured in the same manner as in Example 1. The results are shown in Table 1.

EXAMPLE 4

The extrudate obtained by paste extrusion under the same conditions as in Example 1 was passed between two 500 mm diameter rolls in the extruding direction and thus rolled. As a result, a rolled sheet of 130 mm wide×1.5 mm thick was produced.

As it is clear from Table 1, any of recoverability, sealing property, creep relaxation and MTS was enhanced as compared with Comparative Example 1 where the die having no separators was used, Comparative Example 2 where the heat-treating was carried out at low temperature (300° C.) and Comparative Example 4 where a length of the separator was shortened. Particularly in Example 3 where the uniaxially stretched films produced by using the separators and the biaxially stretched films were overlapped in the total number of 39 films in a ratio of about 1:1, excellent properties equal to those of Comparative Example 3 where 45 conventional biaxially stretched films were overlapped could be obtained.

According to the present invention, it is possible to produce a high performance inexpensive PTFE gasket tape having properties equal to those of biaxially stretched PTFE gasket tape by the uniaxially stretching method which enables the gasket tape to be produced easily at low cost as compared with the biaxially stretching method where intensive production management is required.

What we claim is:

1. A method of producing a polytetrafluoroethylene sheet or film, in which the following steps (1) to (5) are carried out in that order:
   (1) a step for preparing a paste comprising a mixture of a polytetrafluoroethylene powder obtained by emulsion polymerization and an extrusion aid,
   (2) a step for extruding said paste by means of an extruder equipped with a die having an orifice which has a rectangular cross section and is provided with plural separators inside thereof,
   (3) a step for rolling, in the extruding direction, an extrudate having slit lines to give a rolled polytetrafluoroethylene sheet,
   (4) a step for uniaxially stretching the rolled sheet in the rolling direction after removing the extrusion aid from the rolled sheet, and
   (5) a step for heat-treating the uniaxially stretched polytetrafluoroethylene sheet at a temperature within a range of 340° to 380° C., wherein the die of the extruder is provided with a plurality of sheet-like separators in the orifice having a rectangular cross section in parallel with a long side of the orifice, and the plural separators are mounted so that any of free ends of the separators is located at a point exceeding a center point of the long side of the orifice and function to slit the inside of the extrudate in parallel with the long side of the orifice.

2. The production method of claim 1, wherein the die having 2 to 8 separators is used.

3. The production method of claim 1, wherein the uniaxially stretched polytetrafluoroethylene sheet obtained in the uniaxially stretching step (4) is subjected to heat-treating of the step (5) after slitting into a given width or is subjected to slitting of the uniaxially stretched heat-treated polytetrafluoroethylene sheet obtained in the heat-treating step (5).

4. The production method of claim 1, wherein after overlapped and laminated, a plurality of the uniaxially stretched polytetrafluoroethylene films obtained in the uniaxially stretching step (4) are subjected to heat-treating of the step (5) and subsequently slitting into a given width or are subjected to slitting into a given width and subsequently heat-treating of the step (5).

5. The production method of claim 1, wherein after overlapped and laminated, the uniaxially stretched polytetrafluoroethylene films obtained in the uniaxially stretching step (4) and biaxially stretched polytetrafluoroethylene films produced separately are subjected to heat-treating of the step (5) and subsequently slitting into a given width or after overlapped and laminated, the uniaxially stretched polytetrafluoroethylene films obtained in the uniaxially stretching step (4) and the biaxially stretched polytetrafluoroethylene films are subjected to slitting into a given width and subsequently heat-treating of the step (5).

6. The production method of claim 5, wherein a plurality of the uniaxially stretched polytetrafluoroethylene films obtained in the uniaxially stretching step (4) and a plurality of the biaxially stretched polytetrafluoroethylene films produced separately are alternately overlapped each other.

7. The production method of claim 1, wherein the heat-treating of the step (5) is carried out at 340° to 380° C. for 30 minutes or more.

8. The production method of claim 1, wherein in the step (1), the paste contains at least one filler.

9. The production method of claim 8, wherein said filler is at least one selected from the group consisting of titanium oxide, silicon oxide, ceramic powder, graphite and D-glucosamine.

10. The production method of claim 1, wherein after the heat-treating of the step (5) and, if necessary, the slitting into a given width, a step (6) for providing an adhesive layer on at least one surface of the tape is carried out.

11. The production method of claim 8, wherein after the heat-treating of the step (5) and, if necessary, the slitting into a given width, a step (6) for providing an adhesive layer on at least one surface of the tape is carried out.

* * * * *